(12) United States Patent
Ma

(10) Patent No.: US 9,908,369 B2
(45) Date of Patent: Mar. 6, 2018

(54) AIRLESS AND RUNFLAT TIRE STRUCTURES, COMPONENTS AND ASSEMBLY TECHNIQUES

(71) Applicant: MKP Structural Design Associates, Inc., Dexter, MI (US)

(72) Inventor: Zheng-Dong Ma, Ann Arbor, MI (US)

(*) Notice: Subject to any disclaimer, the term of this patent is extended or adjusted under 35 U.S.C. 154(b) by 136 days.

(21) Appl. No.: 14/642,846

(22) Filed: Mar. 10, 2015

(65) Prior Publication Data

US 2015/0251493 A1    Sep. 10, 2015

Related U.S. Application Data

(60) Provisional application No. 61/950,417, filed on Mar. 10, 2014.

(51) Int. Cl.
| | | |
|---|---|---|
| *B60C 7/14* | (2006.01) | |
| *B60C 7/08* | (2006.01) | |
| *B60B 9/04* | (2006.01) | |

(52) U.S. Cl.
CPC .......... *B60C 7/14* (2013.01); *B60B 9/04* (2013.01); *B60C 7/08* (2013.01); *B60C 2007/146* (2013.01)

(58) Field of Classification Search
CPC ....... B60C 7/14; B60C 7/08; B60C 2007/146; B60B 9/04; B60L 39/04
USPC .... 152/5, 11, 12, 55, 69, 72, 75, 79, 80, 84, 152/86
See application file for complete search history.

(56) References Cited

U.S. PATENT DOCUMENTS

| | | | |
|---|---|---|---|
| 1,086,333 A * | 2/1914 | Russell | B60B 9/26 152/80 |
| 1,177,628 A * | 4/1916 | Immke | B60B 9/10 152/31 |
| 4,668,557 A | 5/1987 | Lakes | |
| 5,855,597 A | 1/1999 | Jayaraman | |
| 6,997,944 B2 | 2/2006 | Harrison et al. | |
| 7,160,621 B2 | 1/2007 | Chaudhari et al. | |
| 7,910,193 B2 | 3/2011 | Ma | |
| 8,544,515 B2 | 10/2013 | Ma et al. | |
| 2006/0265052 A1 | 11/2006 | You | |
| 2007/0213838 A1 | 9/2007 | Hengelmolen | |
| 2010/0119792 A1 | 5/2010 | Ma | |
| 2011/0146872 A1* | 6/2011 | Tercha | B60C 7/08 152/520 |
| 2011/0168313 A1* | 7/2011 | Ma | B60C 7/14 152/302 |
| 2011/0240190 A1 | 10/2011 | Summers et al. | |

(Continued)

*Primary Examiner* — S. Joseph Morano
*Assistant Examiner* — Jean Charleston
(74) *Attorney, Agent, or Firm* — John G. Posa; Belzer PC

(57) ABSTRACT

An auxetic wheel according to the invention comprises a line defining an axis of rotation; and a plurality of concentric rings of unit cells surrounding the axis, each unit cell being constructed of a plurality of members defining a Negative Poisson's Ratio (NPR) structure. The outermost ring of unit cells is arranged to facilitate rolling terrain contact, such that the stiffness of the structure in the localized region of loading due to terrain contact increases as the wheel rotates. A layer of material may be disposed between the concentric rings of unit cells which in preferred embodiments comprise a plurality of nested-V shapes. A cover may be provided over the outermost ring of unit cells forming a tire which may, or may not, be inflated.

13 Claims, 23 Drawing Sheets

(56) References Cited

U.S. PATENT DOCUMENTS

2014/0367007 A1\* 12/2014 Thompson .............. B60C 7/102
      152/17

\* cited by examiner

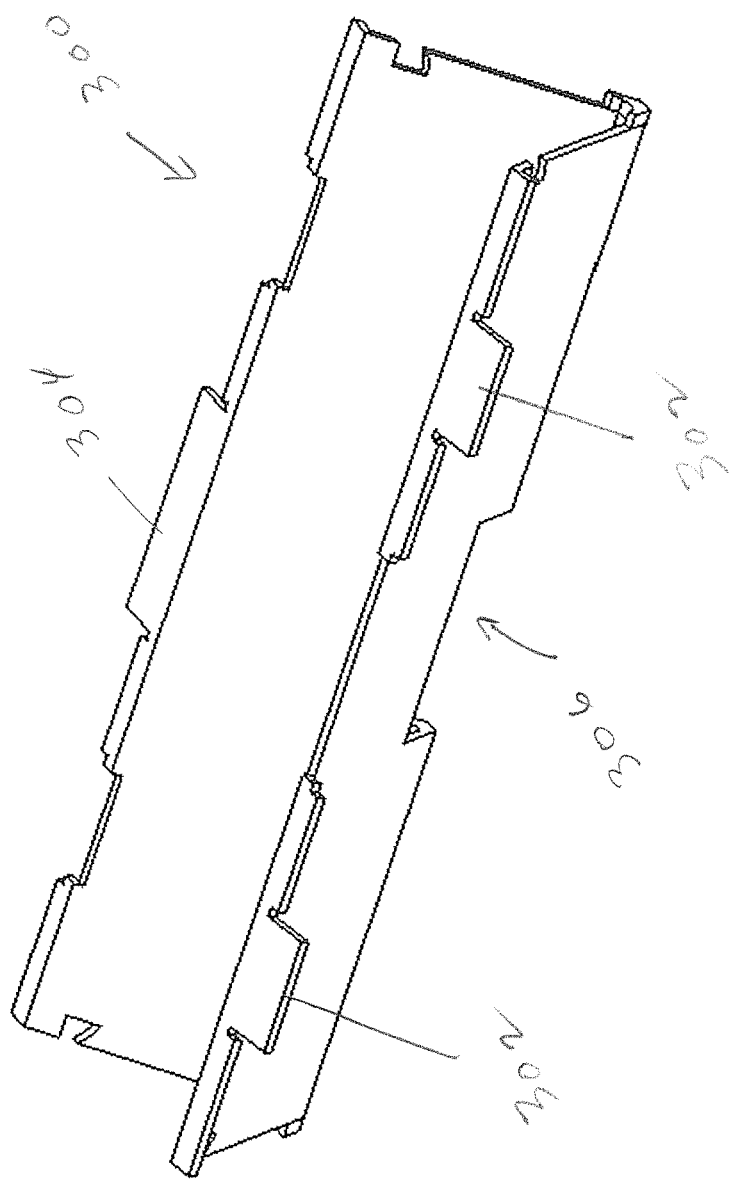

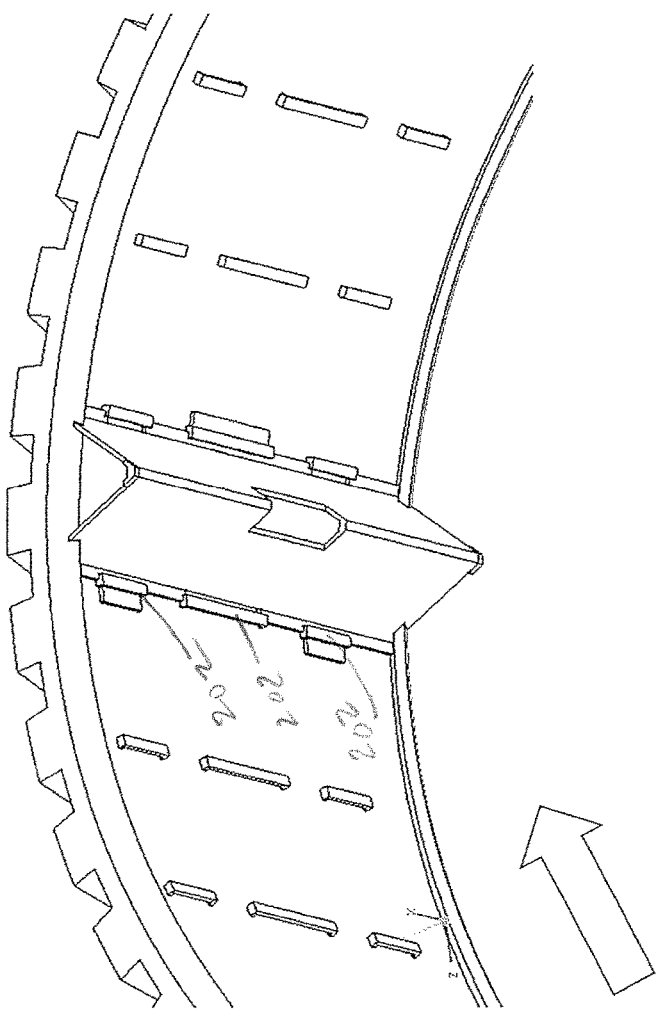
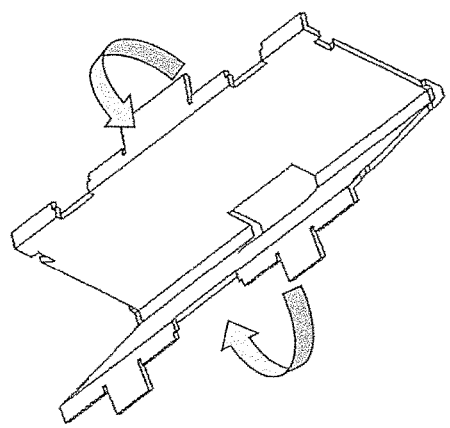
Figure 4

AIRLESS AND RUNFLAT TIRE STRUCTURES, COMPONENTS AND ASSEMBLY TECHNIQUES

REFERENCE TO RELATED APPLICATION

This application claims priority from U.S. Provisional Patent Application Ser. No. 61/950,417, filed Mar. 10, 2014, the entire content of which is incorporated herein by reference.

FIELD OF THE INVENTION

This invention relates generally to negative Poisson's ratio (NPR) or auxetic structures and, in particular, to lightweight, airless and runflat tires based upon such structures.

BACKGROUND OF THE INVENTION

Commercial technologies developed for vehicular "runflat" or "airless" tires include Michelin's Tweels and Resilient Technologies' "non-pneumatic tire." Both of these use a honeycomb configuration for consumer applications. Runflat technology is also important to military applications. A representative military vehicle may impose 10,000 lbs of vehicle load per tire. To enable the vehicle to operate after tires are perforated by terrain or gunfire damage, passive runflat systems are employed inside the tire. The runflats currently found on the military vehicle are designed to provide mobility for a short time after a tire goes flat, but weigh approximately 100 lbs per tire. In addition to runflat technology, the vehicle utilizes a central tire inflation system (CTIS) to operate effectively across different terrain conditions.

Poisson's ratio (v), named after Simeon Poisson, is the ratio of the relative contraction strain, or transverse strain (normal to the applied load), divided by the relative extension strain, or axial strain (in the direction of the applied load). Some materials, called auxetic materials, have a negative Poisson's ratio (NPR). If such materials are stretched (or compressed) in one direction, they become thicker (or thinner) in perpendicular directions.

NPR materials have attracted significant interest due to their unique behaviors. Unlike conventional materials, a NPR material may shrink when compressed along a perpendicular direction. One result of this behavior is that the material can concentrate itself under the compressive load to better resist the load. Thus, a NPR material becomes stiffer and stronger as the amplitude of the load increases. It has also been found that NPR can improve material/structural properties, including enhanced thermal/shock resistance, fracture toughness, indentation resistance and shear modulus. [1-3].

Auxetic and NPR structures have been used in a variety of applications. According to U.S. Pat. No. 7,160,621, an automotive energy absorber comprises a plurality of auxetic structures wherein the auxetic structures are of size greater than about 1 mm. The article also comprises at least one cell boundary that is structurally coupled to the auxetic structures. The cell boundary is configured to resist a deformation of the auxetic structures.

The vast majority of auxetic structures are polymer foams. U.S. Pat. No. 4,668,557, for example, discloses an open cell foam structure that has a negative Poisson's ratio. The structure can be created by triaxially compressing a conventional open-cell foam material and heating the compressed structure beyond the softening point to produce a permanent deformation in the structure of the material. The structure thus produced has cells whose ribs protrude into the cell resulting in unique properties for materials of this type.

Commonly assigned U.S. Pat. No. 7,910,193, the entire content of which is incorporated herein by reference, describes two- and three-dimensional NPR structures/materials and applications. The negative Poisson ratio effect causes the surrounding material to concentrate into the local area of loading. Consequently, the material becomes stiffer and stronger in the area of the applied load. Moreover, this stiffening behavior is retained under nonlinear, large deformation response.

NPR structures can react differently under different applied loads. Three unique features of NPR systems include: a) material concentration, b) bulging effect, and c) impact force mitigation. FIG. 1 of the '193 patent illustrates a reactive shrinking mechanism of a NPR material. The unique property of this structure, which includes a plurality of "nested-V" shapes, is that it will shrink in two directions if compressed in one direction. When the structure is under a compressive load on the top of the structure, more material is gathered together under the load so that the structure becomes stiffer and stronger in the local area to resist against the load.

Commonly assigned U.S. Pat. No. 8,544,515, also incorporated herein by reference, is broadly directed to the use of NPR materials to produce runflat or airless tires. Such materials should provide improved stiffness/weight and survivability, compared to honeycomb, foam, or other cellular materials. Further, because the stiffening behavior of certain NPR structures is retained under nonlinear, large deformation responses and it can be functionally tailored, a runflat tire system based upon such materials should provide performance responses similar to pneumatic tire.

NPR tires can be tailored and functionally-designed to optimally meet runflat requirements for both military and commercial vehicles. NPR runflat tires may be fabricated using standard materials and simple manufacturing processes, resulting in low-cost and high-volume production. NPR runflat tire designs are fully compatible with Central Tire Inflation Systems (CTIS), while providing a performance equivalent to current military vehicle solutions but at half the weight.

SUMMARY OF THE INVENTION

Negative Poisson's ratio (NPR) or auxetic are used to make lightweight wheels and airless/runflat tires. The NPR tires can be tailored and functionally-designed to optimally meet the runflat requirements for both military and commercial vehicles. NPR-runflat tires may be fabricated using standard materials and simple manufacturing processes, resulting in low-cost and high-volume production.

In preferred embodiments the runflat tire designs are fully compatible with Central Tire Inflation Systems (CTIS), while providing a performance equivalent to current military vehicle solutions but at half the weight.

An auxetic wheel according to the invention comprises a line defining an axis of rotation; and a plurality of concentric rings of unit cells surrounding the axis, each unit cell being constructed of a plurality of members defining a Negative Poisson's Ratio (NPR) structure.

The outermost ring of unit cells is arranged to facilitate rolling terrain contact, such that the stiffness of the structure in the localized region of loading due to terrain contact increases as the wheel rotates. A layer of material may be disposed between the concentric rings of unit cells which in preferred embodiments comprise a plurality of nested- V shapes. A cover may be provided over the outermost ring of unit cells forming a tire which may, or may not, be inflated.

An airless, run-flat tire structure constructed in accordance with the invention comprises an inner rim having a width and a central axis of rotation, an outer tread structure, and a ring of V-shaped structural members disposed circumferentially between the inner rim and the outer tread structure. Each structural member comprises two panels joined at a common edge forming a V-shaped cross section, with the other edge of each panel terminating in a pair opposing edges, such that each V-shaped structural member has a height defined as the distance between a plane tangent to its opposing edges and its common edge. In the preferred embodiment the common edges of the V-shaped structural members are oriented toward the outer tread structure and the opposing edges are oriented toward the inner rim, through alternative embodiments are anticipated with the V-shaped structural members oriented in the opposite direction.

The airless, run-flat tire structure may include two or more concentric rings of V-shaped structural members, with a concentric belt disposed between one or more of the concentric rings of V-shaped structural members. The V-shaped structural members are preferably metal or other rigid material, whereas the concentric belt is made of a rubber, rubber-like, or other flexible, elastomeric material. The opposing ends of the V-shaped structural members may be rigidly or flexibly coupled to the inner rim structure through joints, for example.

The airless, run-flat tire structure may include a plurality of rings of V-shaped structural members, and wherein the outermost ring may include chamfered edges to receive a radial tread structure. The number of the V-shaped structural members in each ring may be the same or different, and/or the height of the V-shaped structural members in each ring may be the same or different. The common edges of the V-shaped structural members may include one or more notches to receive one or more separate, side-by-side concentric belts.

The outer tread structure may include an underside with a plurality of tab-receiving structures, with the opposing edges of the V-shaped structural members featuring tabs adapted to be received by the tab-receiving structures. The airless, run-flat tire structure may include at least two rings of V-shaped structural members separated by a concentric belt, with the belt having one outer surface configured to receive the opposing edges of the V-shaped structural members and an opposing outer surface to receive the common edges of the V-shaped structural members.

The airless, run-flat tire structure may include inner and outer rings of V-shaped structural members separated by a concentric belt. The V-shaped structural members of each ring may lie directly above and below one another in a nested configuration, such that lines drawn radially outwardly from the central axis of rotation pass through two the common edges of the V-shaped structural members in the inner and outer rings. The concentric belt may be made of a flexible material, such that the inner and outer rings of V-shaped structural members and the concentric belt form a negation-Poisson-ratio or auxetic structure, whereby localized loading against a region of the outer tread structure increases the stiffness around that localized region.

BRIEF DESCRIPTION OF THE DRAWINGS

FIG. 3 depicts a single stuffer design;

FIG. 4 shows the way in which the stuffers are inserted into the hooks inside the tread structure using a pre-compressed force;

DETAILED DESCRIPTION OF THE INVENTION

This invention improves upon and extends the applicability of negative Poisson's ratio (NPR) or auxetic structures to lightweight wheels and runflat tires based upon such structures. This disclosure described in further detail the underlying structures, finished tires based upon the technology, as well as manufacturing methods.

An auxetic wheel according to the invention features a plurality of concentric rings of unit cells extending radially outwardly from an axis of rotation, each unit cell being constructed of a plurality of members defining a Negative Poisson's Ratio (NPR) structure. The outermost ring of unit cells is arranged to facilitate rolling terrain contact, such that the stiffness of the structure in the localized region of loading due to terrain contact increases as the wheel rotates.

A layer of material may be disposed between the concentric rings of unit cells which in preferred embodiments comprise a plurality of nested-V shapes. A cover may be provided over the outermost ring of unit cells forming a tire which may, or may not, be inflated.

Figure 1:
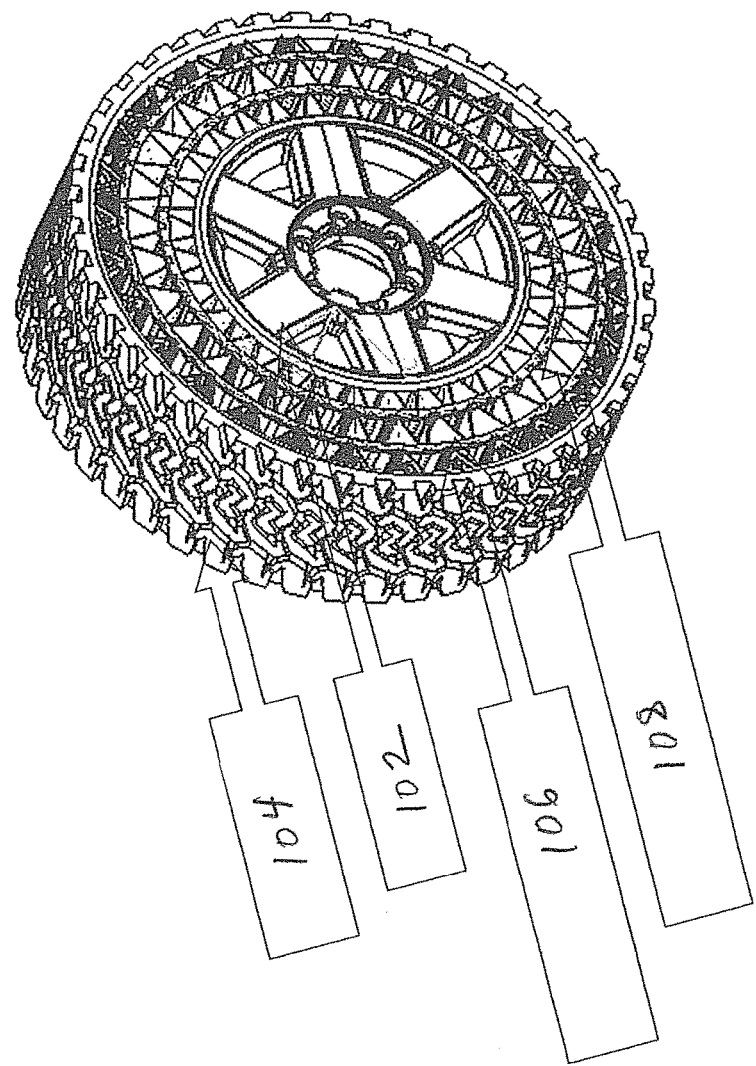
FIG. 1 is an example of an off-road wheel constructed in accordance with the present invention.

FIG. 1 is an example of an off-road wheel constructed in accordance with the invention. This particular example includes an inner rim 102 and an outer tread structure 104, with an intervening NPR structure 106 including a plurality of V-shaped units cells discussed in further detail below. This example has with 3 rings, each with 30 unit cells, separated by composite rings 108.

In terms of materials, rim 102 may be made of conventional materials including metals such as steel or aluminum. Alternative rigid materials such as hard plastics or reinforced composites may also be used. Treads 104 may also be conventional, using natural or artificial rubbers, with or without belting, and any appropriate outer tread structure including water-ejecting, radial, snow, all-weather, and so forth. The V-shaped unit cells may be metal or rigid plastic, and the composite belts 108 may be composed of natural or artificial rubbers or other elastomeric or polymeric materials.

Figure 2A:
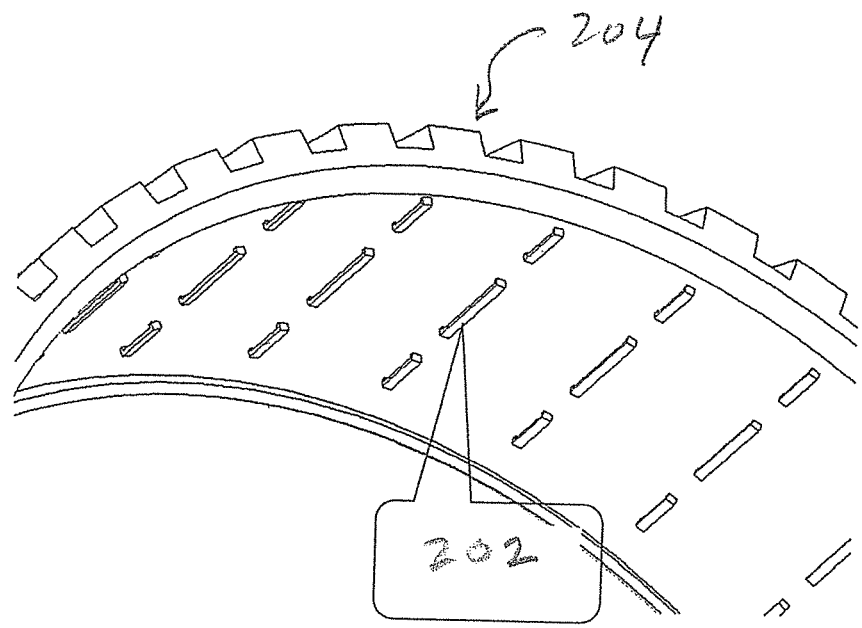
FIGS. 2A and 2B illustrate one internal tread structure option that utilizes steel wires and 30 hooks for attachment purposes.
Figure 2B:
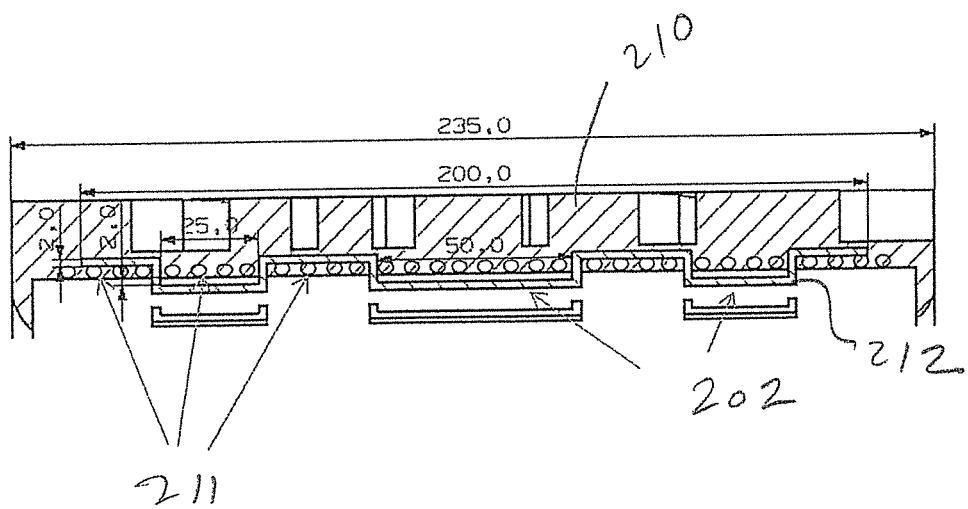

FIG. 2A illustrates one outer tread structure option that utilizes hooks 202 for attachment purposes. The outer tread is depicted at 204. FIG. 2B is a cross section of the structure of FIG. 2A with a non-limiting set of dimensions. Cross-hatched area 210 is the tread material, with preferred steel reinforcing wires 211. Hooks 202 either form part of, or attach to, a meandering steel frame 212, portions of which protrude through the lower, inner surface of the tread structure.

FIG. 3 depicts a single V-shaped unit cell constructed in accordance with the invention, which includes tabs 302 for mounting purposes. Notch 306 may be used to retain a single composite belt as described below. FIG. 4 shows the way in which the tabs of the V-shaped unit cells are inserted into the hooks 202 inside the tread structure using a pre-compressed force.

Figure 5:
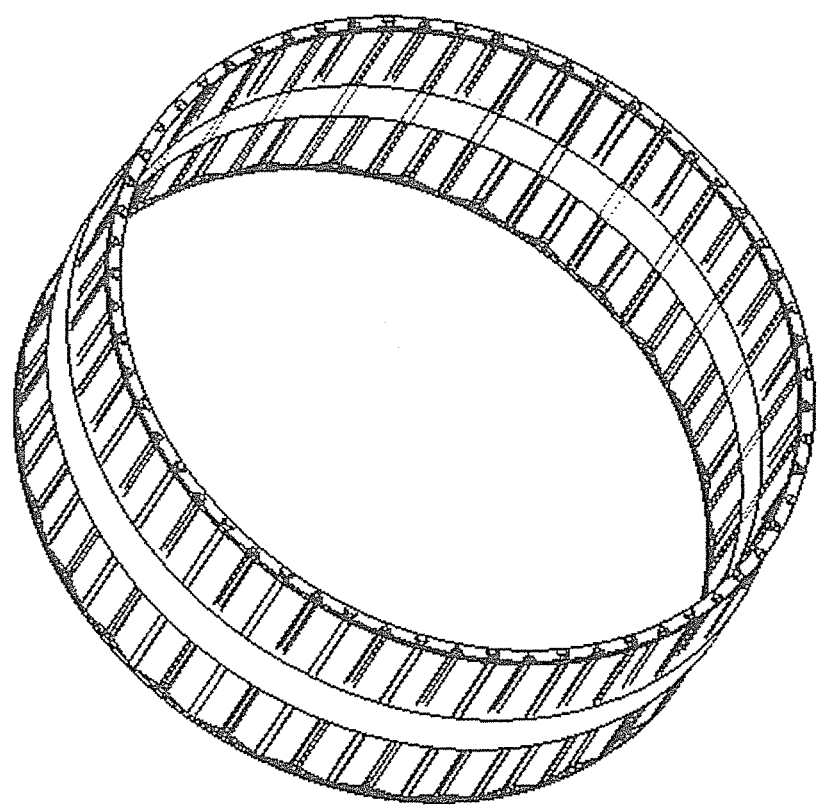
FIG. 5 is an example of a composite ring structure.
Figure 6:
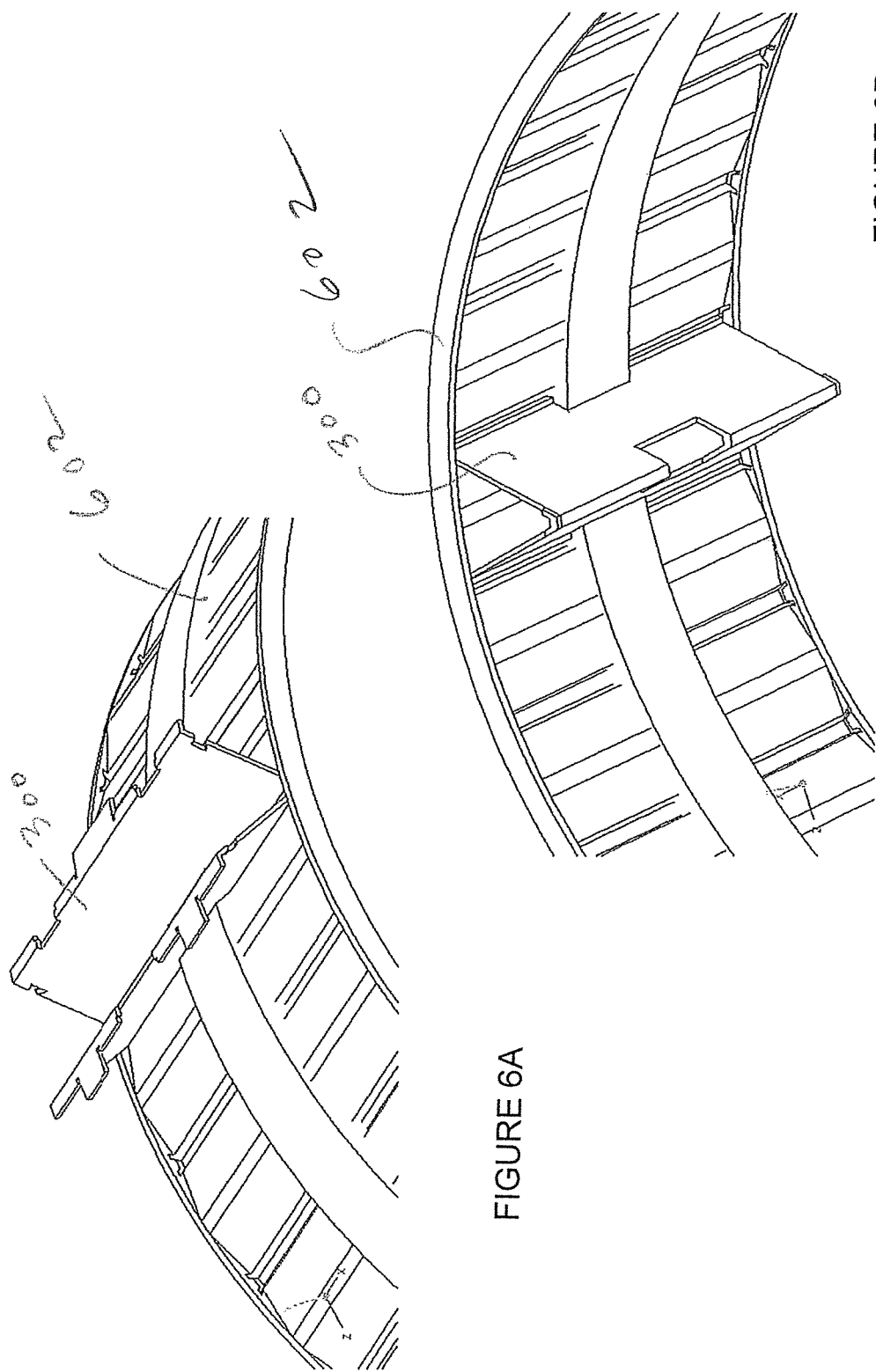
FIGS. 6A and 6B show how the stuffers are coupled to the composite ring.
Figure 12:
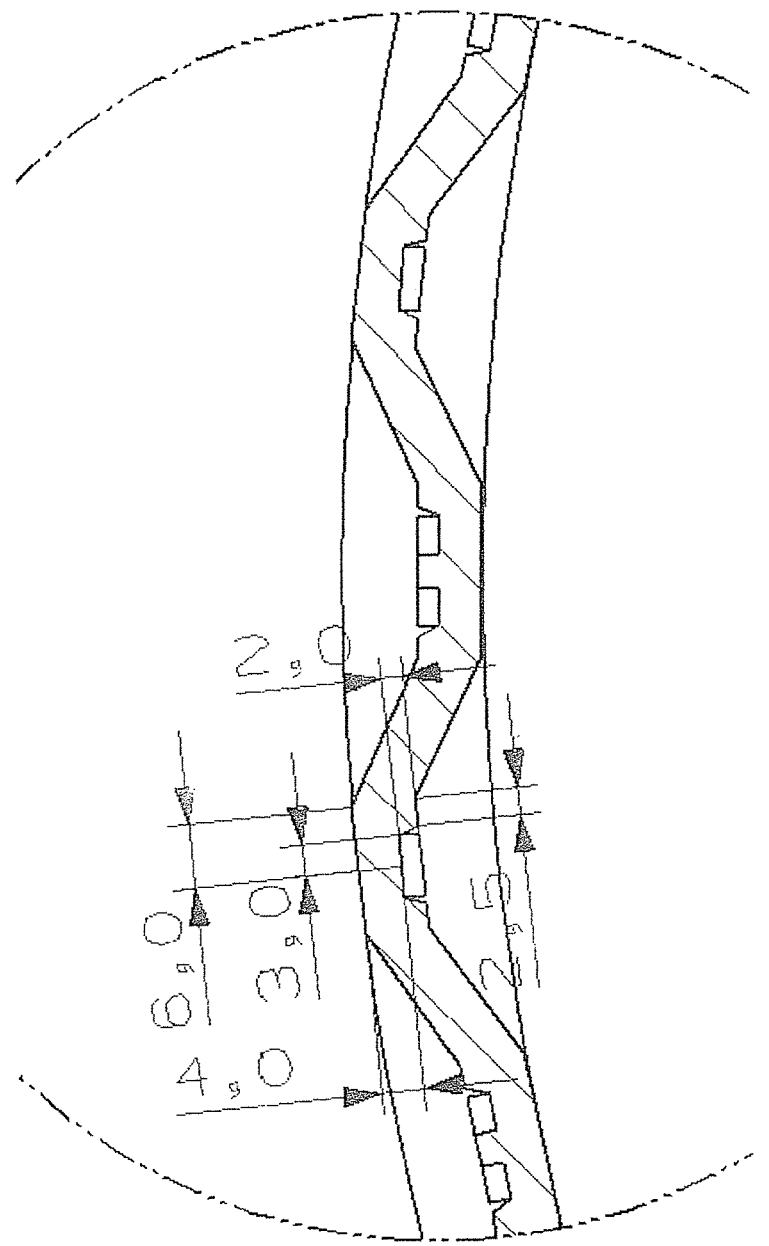
FIG. 12 gives details of this second ring with dimensions.

FIG. 5 is an example of a composite ring structure. As better seen in the cross section of FIG. 12, the ring has ridges and valleys to retain the lower legs and upper edges of the V-shaped unit cells 300. More specifically, FIG. 6A shows the way in which the upper edge fits into a portion of a composite ring 602, and FIG. 6B illustrates the way in which the lower legs may couple to the opposite surface of the ring 602. Although the ring is shown as a single, integrated band, as described below, separate multiple bands of material may be used.

Figure 7:
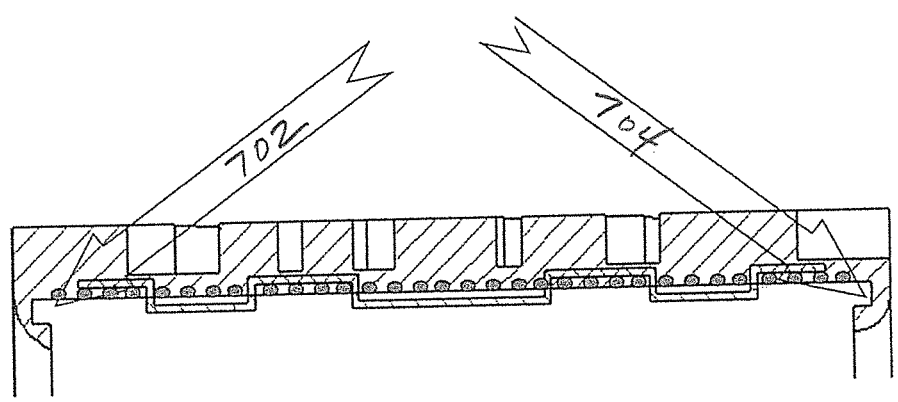
FIG. 7 depicts an alternative tread structure option with grooves on two sides.
Figure 8:
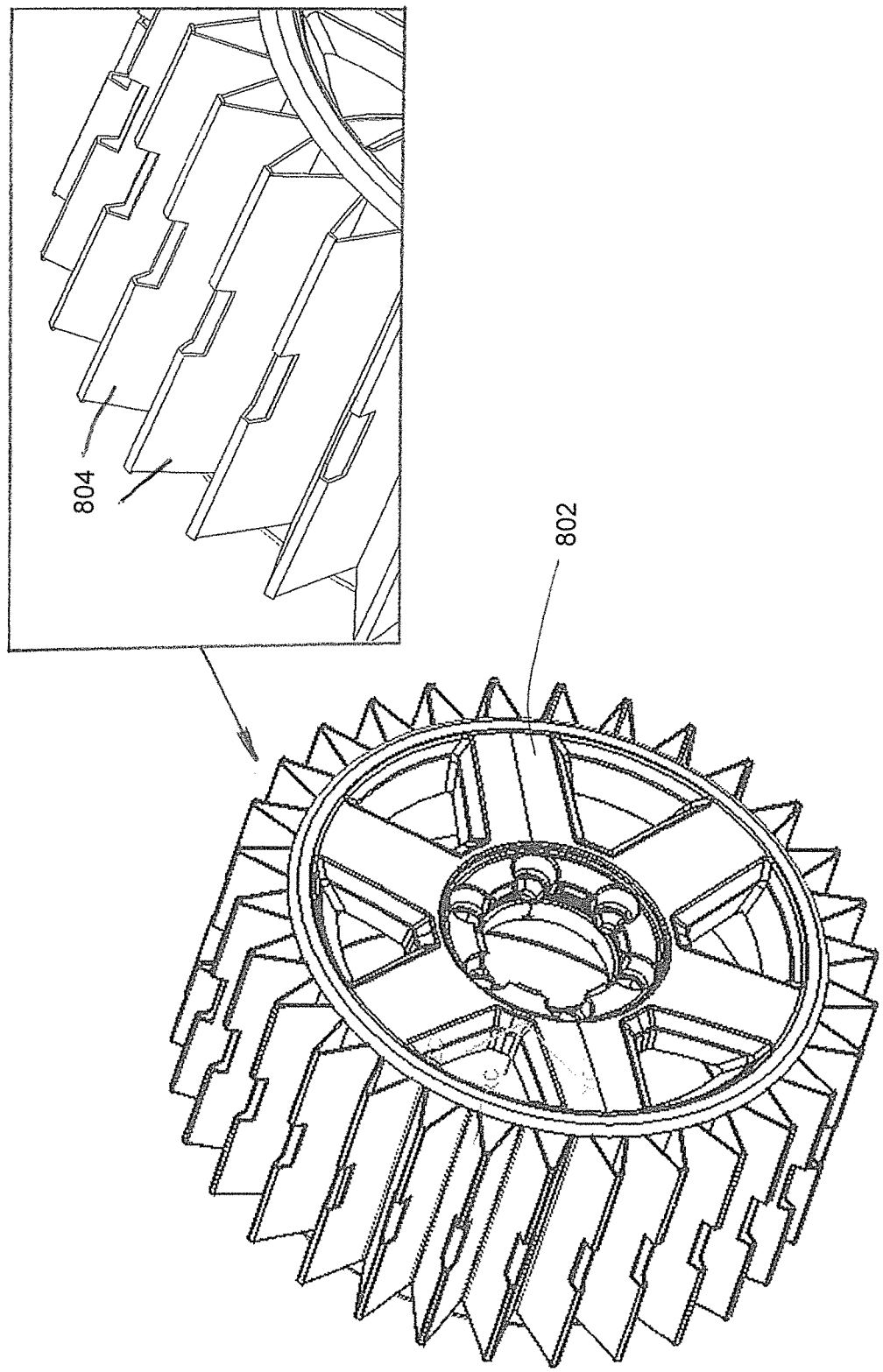
FIG. 8 illustrates first (bottom) layer assembling.
Figure 9:
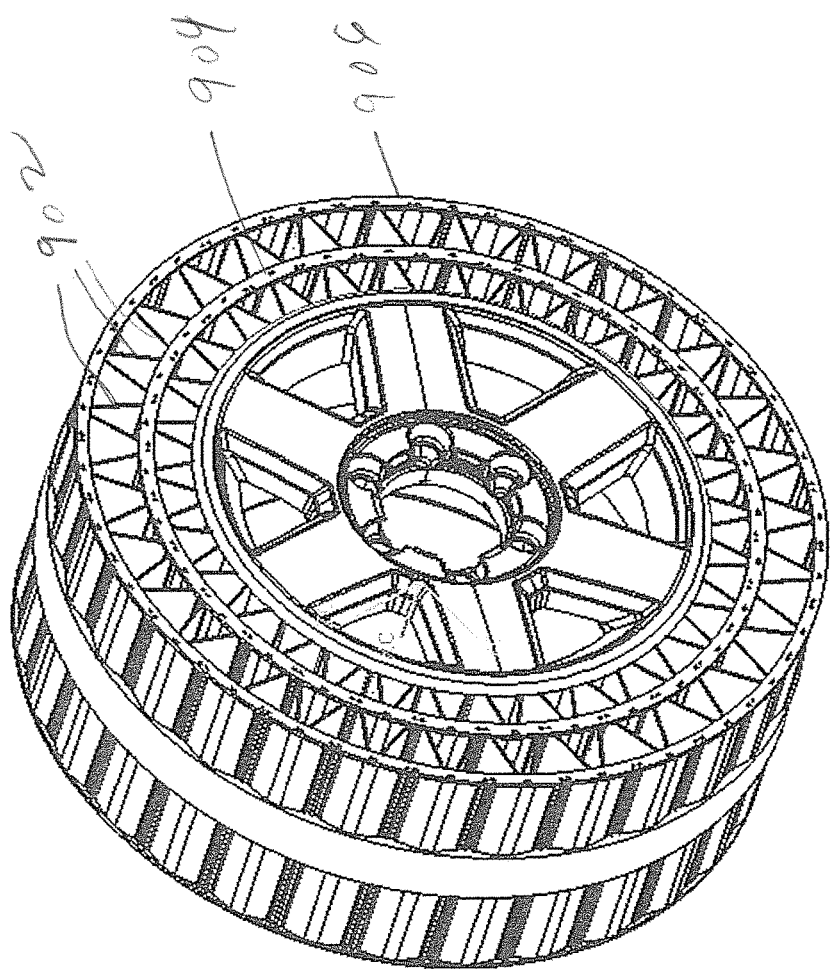
FIG. 9 shows second layer assembling.

FIG. 7 depicts an alternative tread structure option with grooves 702, 704 on opposing sides to better capture and retain the V-shaped unit cells. FIG. 8 illustrates a rim 802 including a plurality of V-shaped cells 804 installed or attached thereto. FIG. 9 continues the assembly of the structure of FIG. 8, now showing a second ring of V-shaped cells 902 separated from the first ring by a first composite belt 904. This Figure also depicts a second, outer composite ring 906.

Figure 10:
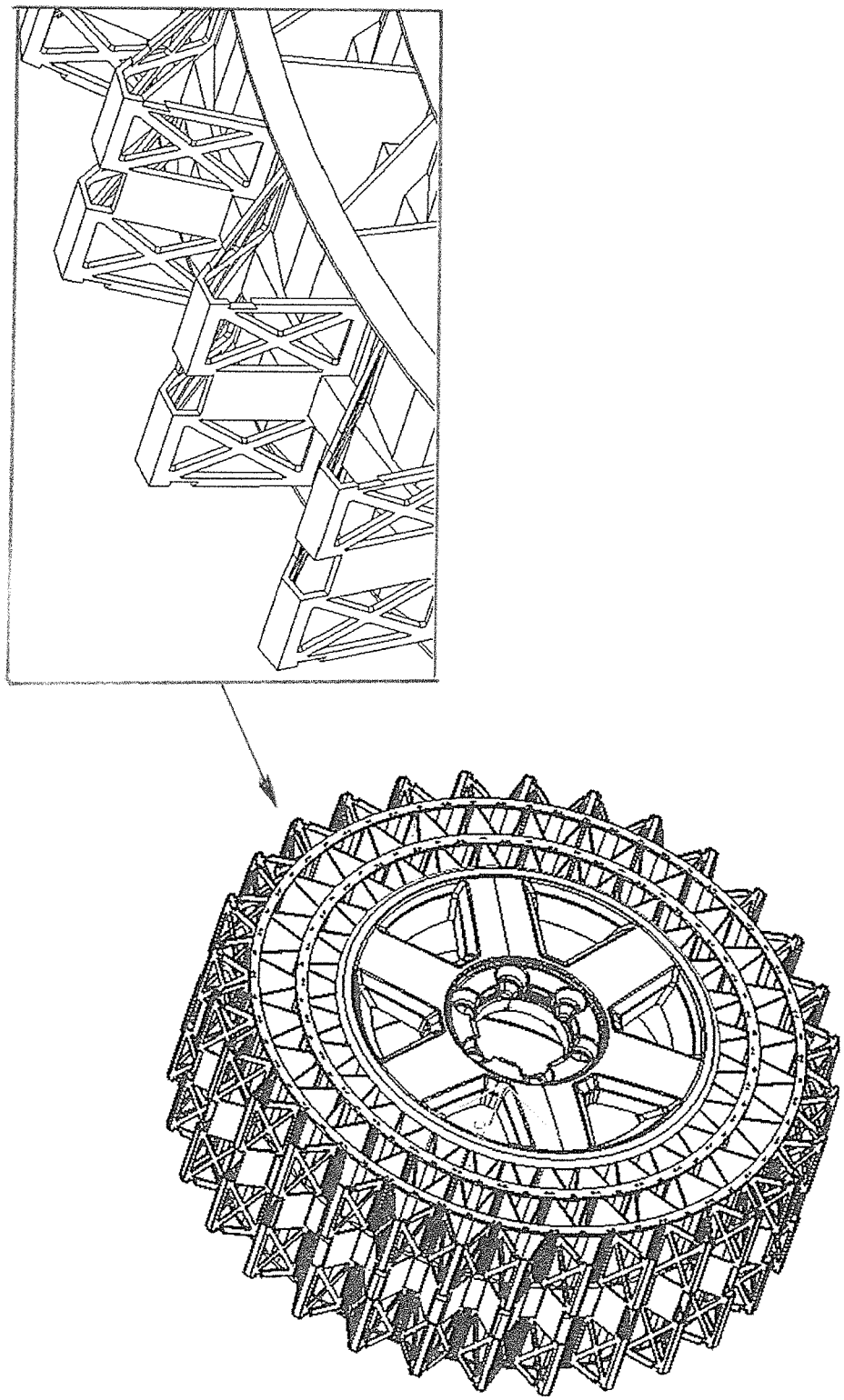
FIG. 10 shows the third or top layer of assembling.

FIG. 10 shows the use of optional V-shaped cells having material removed to reduce weight. Such skeletal structures could also add strength and/or reduce cost.

Figure 11:
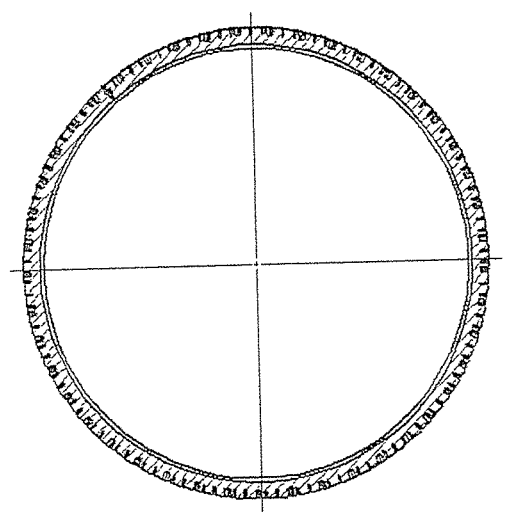
FIG. 11 depicts an alternative tread structure option that uses additional grooves without hooks.
Figure 13:
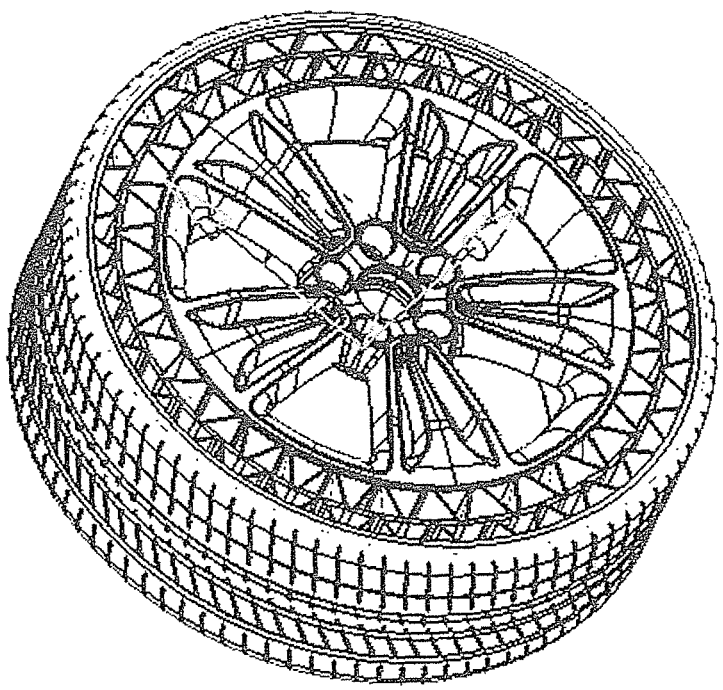
FIG. 13 shows an example of an on-road vehicle wheel.
Figure 14:
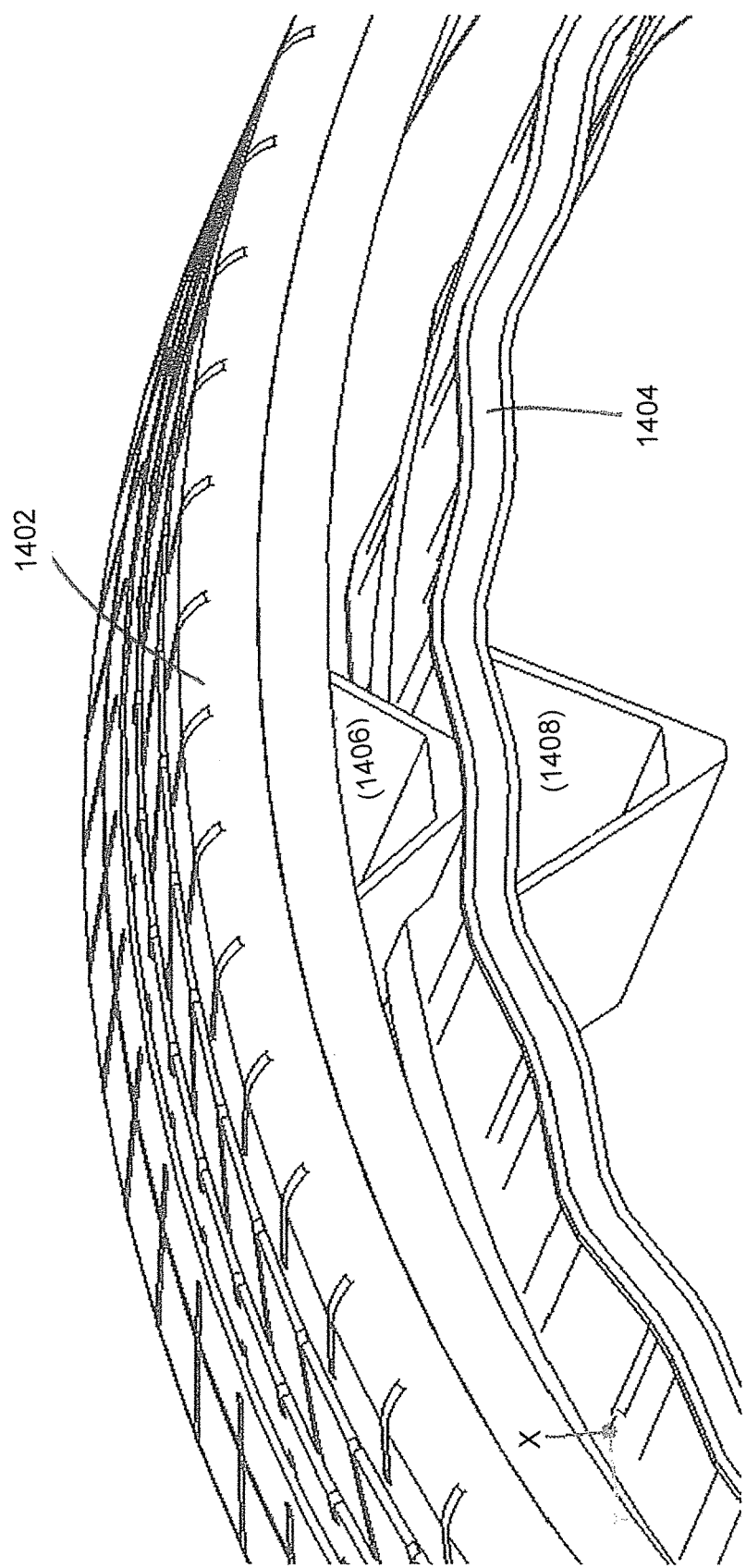
FIGS. 14 and 15 show the stuffer assembly of the on-road wheel structure.
Figure 15:
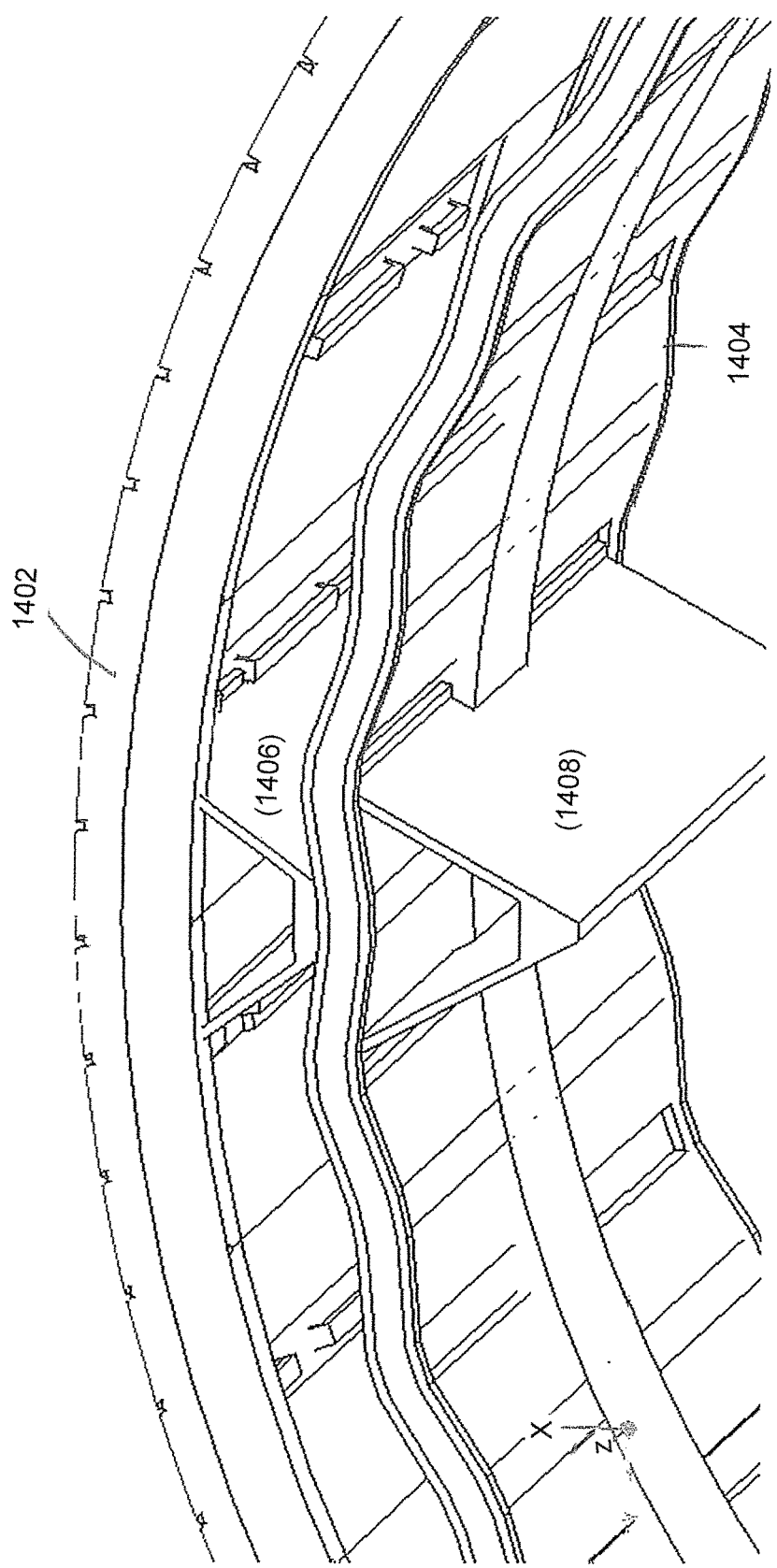

FIG. 11 illustrates a side, cross section of an entire outer tread structure and, as discussed previously, FIG. 12 is a cross section of a composite ring with a non-limiting set of dimensions. FIG. 13 illustrates a finished wheel following final assembly. Note that instead of the V-shaped cells being clipped into place they may be slid in from the side and held in place through friction and/or tension. FIG. 14 is a detail drawing that shows an outer tread structure 1402, and 2 nested Vs 1406, 1408 that forms part of a negative Poisson's ratio (NPR) or auxetic structure such that, when fully assembled, the stiffness of the structure in the localized region of loading due to terrain contact increases as the wheel rotates. FIG. 15 is a bottom view of the structure of FIG. 14

Figure 16:
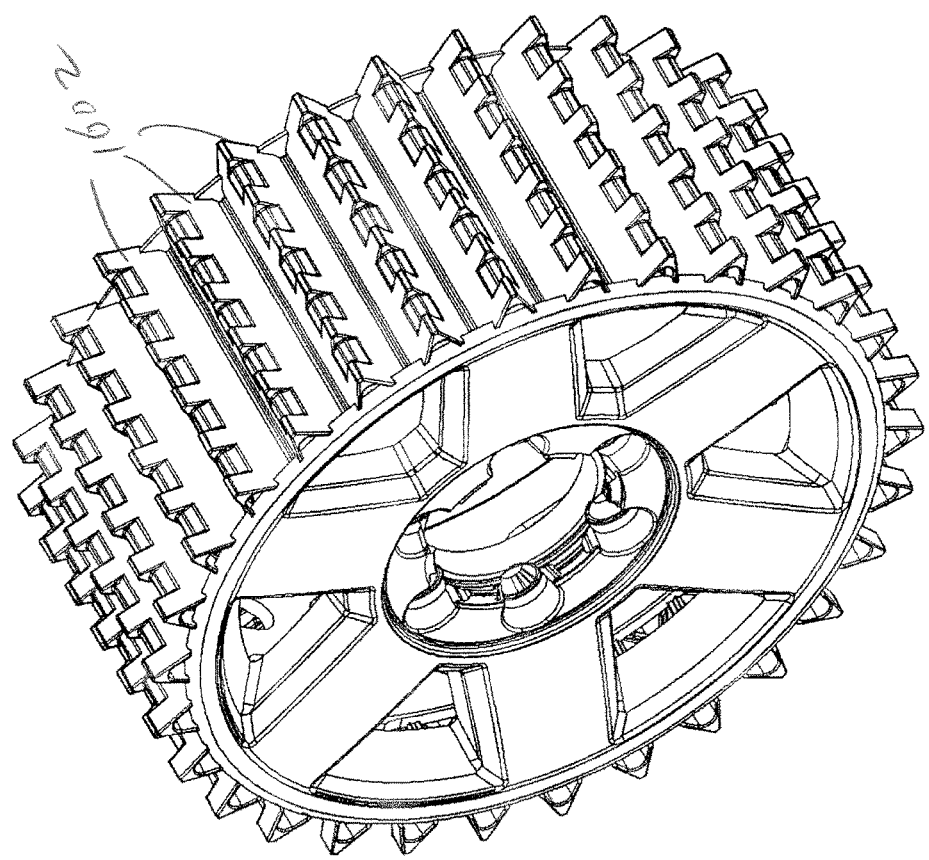
FIG. 16 shows a first ring of stuffers attached to a rim.
Figure 17:
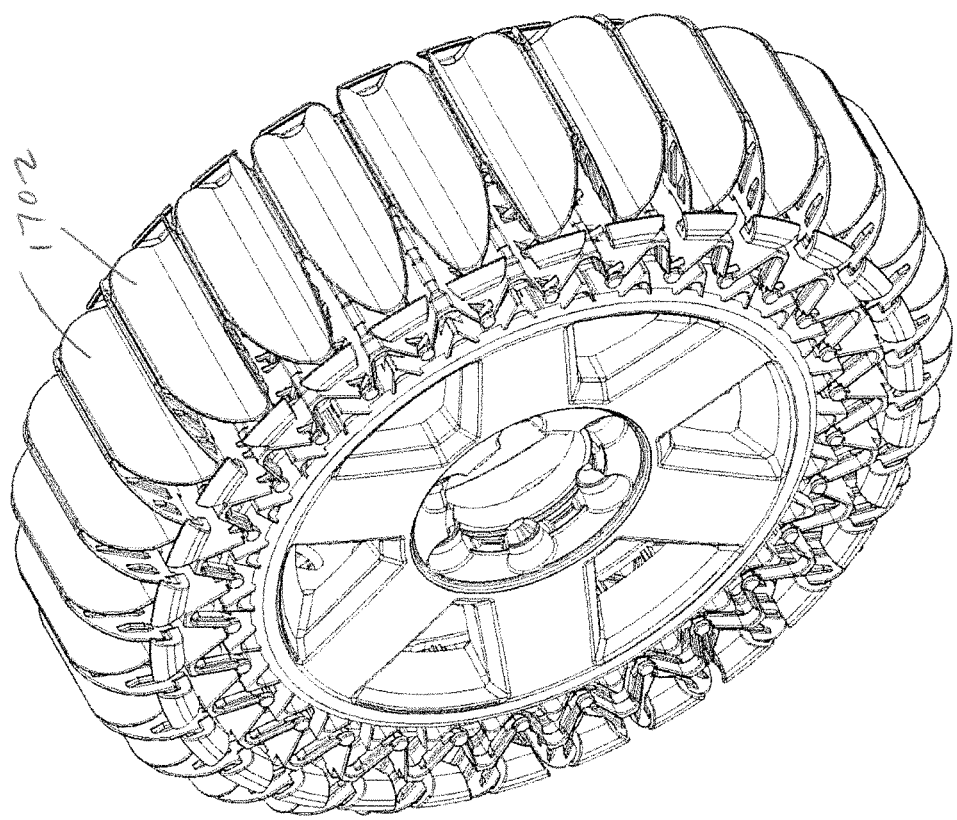
FIG. 17 illustrates a third ring of stuffer members with curved.
Figure 18:
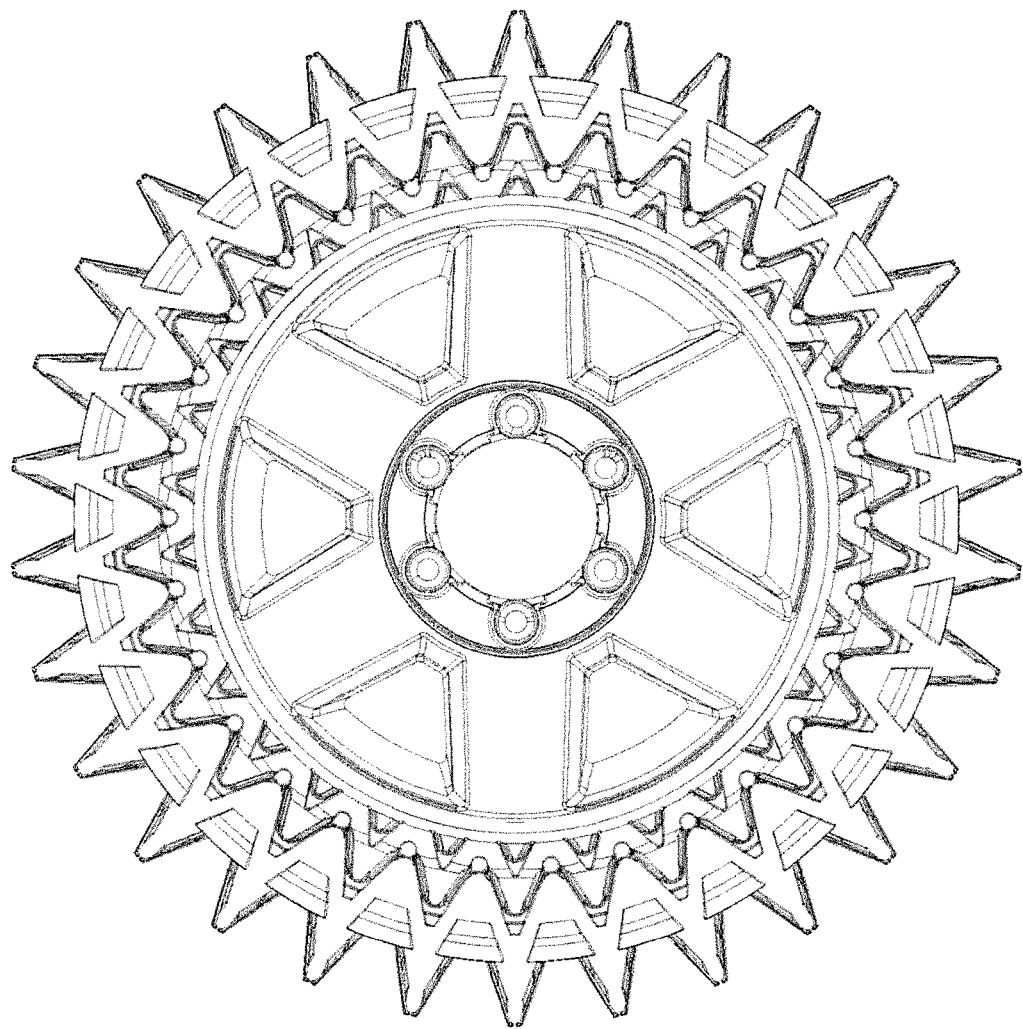
FIG. 18 shows chamfered sides enabling the final assembly of a radial tread design.
Figure 19:
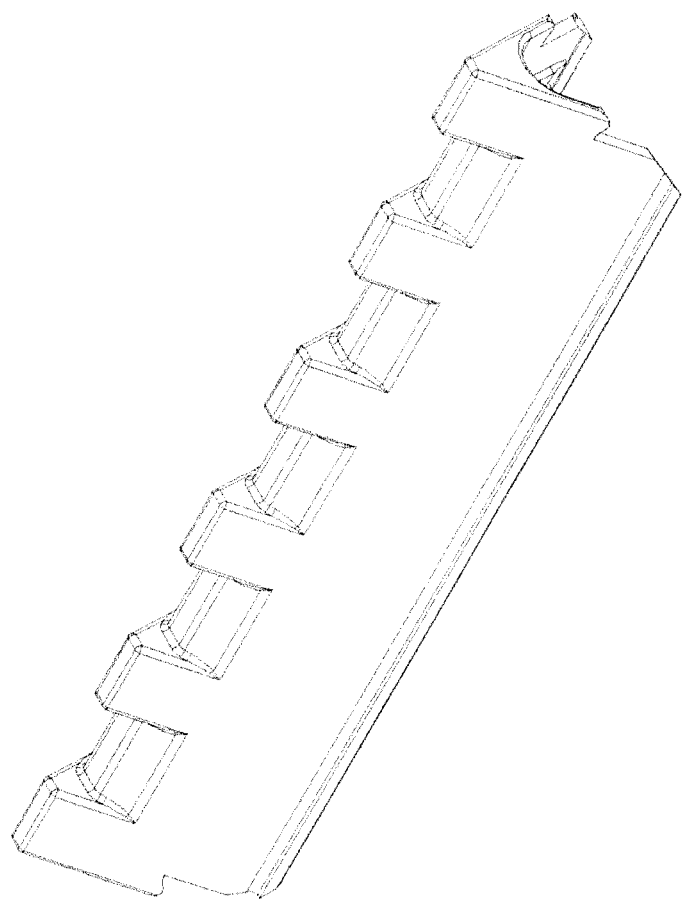
FIGS. 19-20 show detail drawings of the three stuffers, respectively.
Figure 20:
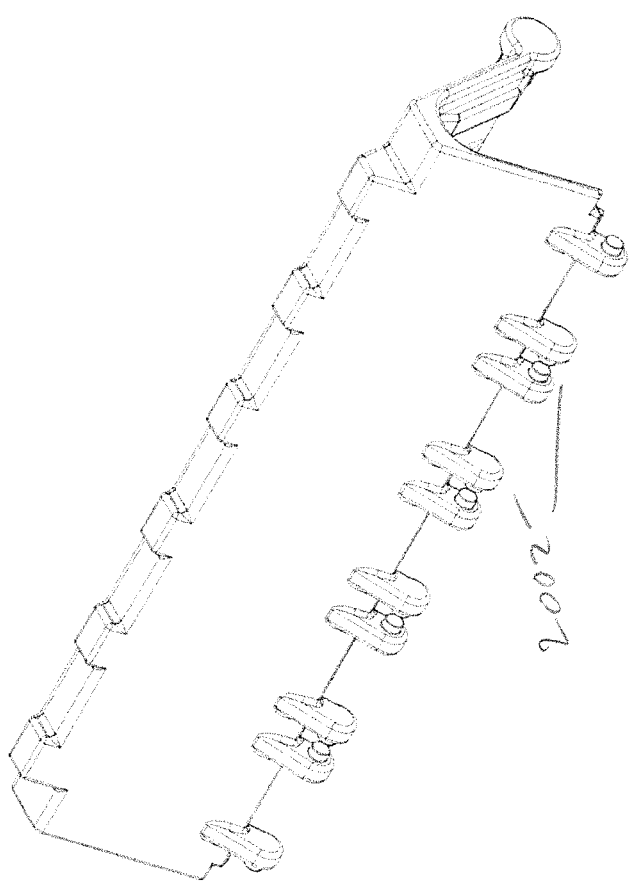

FIG. 16 illustrates alternative V-shaped cells with multiple notches 1602 to carry multiple, spaced apart belts. FIG. 19 is a detail view. FIG. 17 illustrates further alternative V-shaped cells with curved outer legs 1702 to better accommodate a radial tread structure. FIG. 18 is a cross section showing an assembly with multi-belt composite ring construction. FIG. 20 depicts a further alternative wherein the V-connections are pivoting or rotatable couplings 2002.

Figure 21:
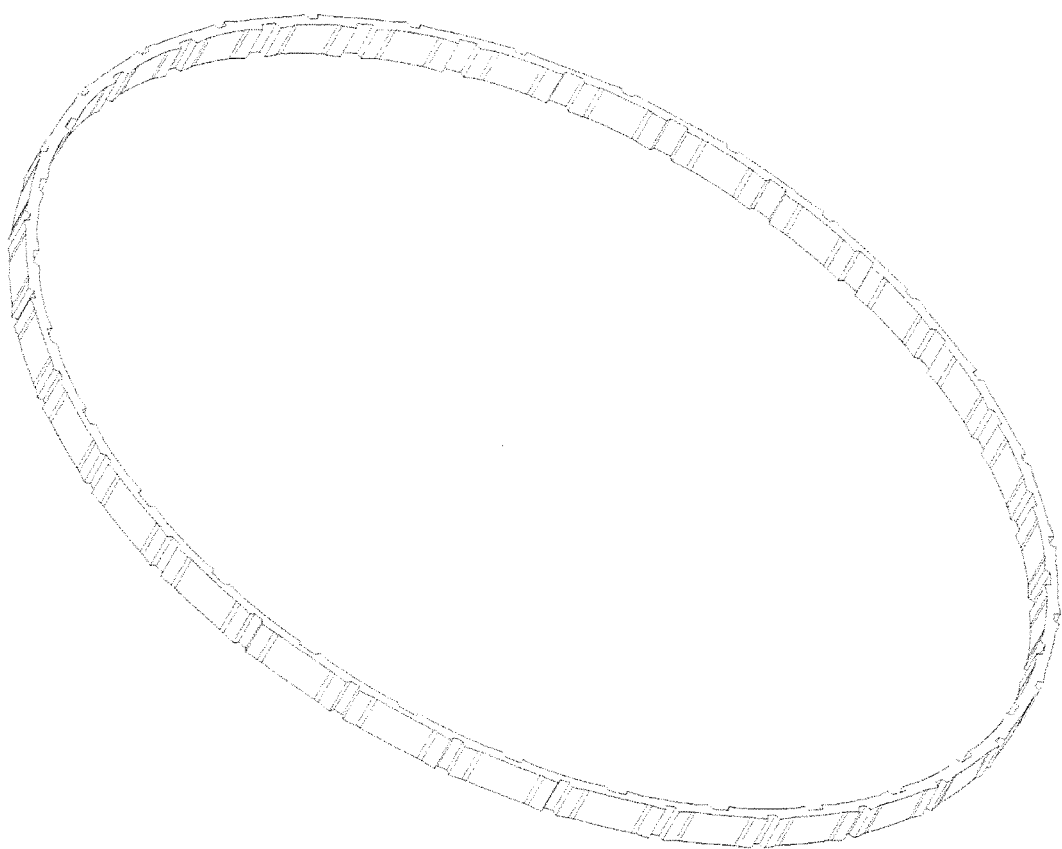
FIG. 21 shows a separate band that may be used in multiples between each concentric layer of unit cells.
Figure 22:
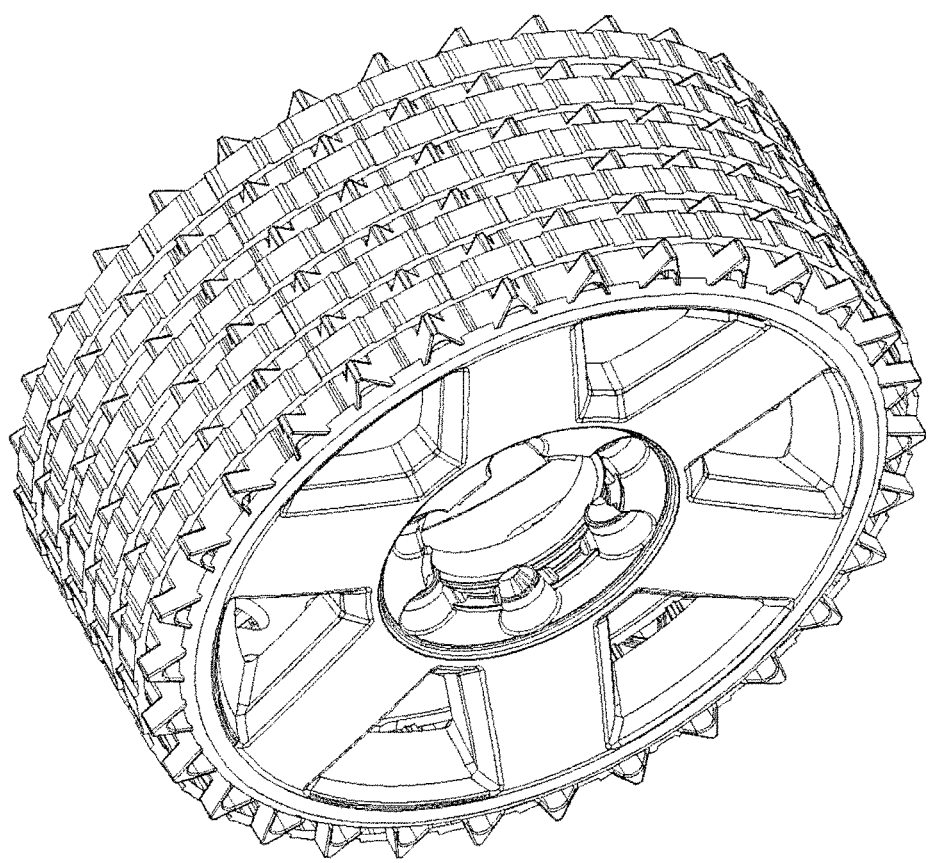
FIG. 22 shows an inner wheel assembly using a plurality of the bands of FIG. 21.
Figure 23:
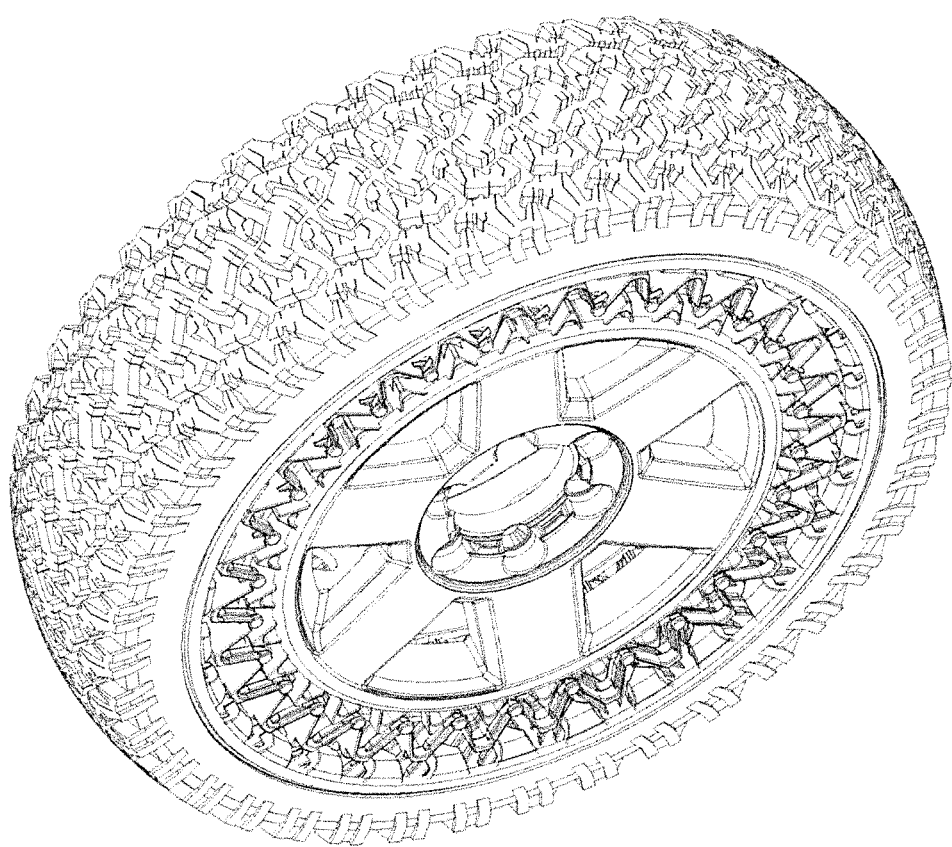
FIG. 23 shows the tire structure of FIGS. 21, 22 with an outer tread covering.

FIG. 21 is a detail view of a single ring used in a multi-belt composite ring construction. FIG. 22 is an inner wheel showing how multiple, spaced-apart rings of the type depicted in FIG. 21 may be assembled onto V-shaped cells with appropriate notches. FIG. 23 is a completed wheel incorporating the subassemblies of FIGS. 21, 22.

The invention claimed is:

1. An airless, run-flat tire structure, comprising:
   an inner rim having a width and a central axis of rotation;
   an outer tread structure;
   two or more concentric rings, each with a plurality of physically separate V-shaped structural members;
   a concentric belt disposed between one or more of the concentric rings of V-shaped structural members; and
   wherein the physically separate V-shaped structural members within each ring are arranged circumferentially between the inner rim and the outer tread structure, each structural member comprising two panels joined at a common edge forming a V-shaped cross section, with the other edge of each panel terminating in a pair opposing edges, each V-shaped structural member having a height defined as the distance between a plane tangent to its opposing edges and its common edge.

2. The airless, run-flat tire structure of claim 1, wherein the common edges of the V-shaped structural members are oriented toward the outer tread structure and the opposing edges are oriented toward the inner rim.

3. The airless, run-flat tire structure of claim 1, wherein the V-shaped structural members are metal or another rigid material.

4. The airless, run-flat tire structure of claim 2, including a concentric belt made of a rubber, rubber-like, or another flexible, elastomeric material.

5. The airless, run-flat tire structure of claim 1, wherein the opposing ends of the V-shaped structural members are rigidly coupled to the inner rim structure.

6. The airless, run-flat tire structure of claim 1, wherein the opposing ends of the V-shaped structural members are flexibly coupled to the inner rim structure.

7. The airless, run-flat tire structure of claim 1, wherein the opposing ends of the V-shaped structural members are flexibly coupled to the inner rim structure through joints.

8. The airless, run-flat tire structure of claim 1, wherein the outermost ring has chamfered edges to receive a radial tread structure.

9. The airless, run-flat tire structure of claim 1, wherein the number of the V-shaped structural members in each ring are the same or different.

10. The airless, run-flat tire structure of claim 1, wherein the height of the V-shaped structural members in each ring are the same or different.

11. The airless, run-flat tire structure of claim 1, wherein:
   the outer tread structure includes an underside with a plurality of tab-receiving structures; and
   the opposing edges of the V-shaped structural members include tabs received by the tab-receiving structures.

12. The airless, run-flat tire structure of claim 1, wherein the concentric belt has one outer surface configured to receive the opposing edges of the V-shaped structural members and an opposing outer surface to receive the common edges of the V-shaped structural members.

13. The airless, run-flat tire structure of claim 1, wherein the V-shaped structural members of each ring are disposed directly above and below one another in a nested configuration, such that lines drawn radially outwardly from the central axis of rotation pass through two the common edges of the V-shaped structural members in the inner and outer rings; and wherein the concentric belt is made of a flexible material such that the inner and outer rings of V-shaped structural members and the concentric belt form a negation-Poisson-ratio or auxetic structure whereby localized loading against a region of the outer tread structure increases the stiffness around that localized region.

* * * * *